(12) United States Patent
Cox et al.

(10) Patent No.: US 11,986,727 B2
(45) Date of Patent: May 21, 2024

(54) INPUT DEVICE CONFIGURATION OF A GAME CONTROLLER BASED ON DETECTION OF A GAMEPLAY EVENT

(71) Applicant: Dell Products L.P., Round Rock, TX (US)

(72) Inventors: Tyler Ryan Cox, Austin, TX (US); Erik Summa, Austin, TX (US); Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 17/647,712

(22) Filed: Jan. 11, 2022

(65) Prior Publication Data
US 2023/0218988 A1 Jul. 13, 2023

(51) Int. Cl.
A63F 13/24 (2014.01)
(52) U.S. Cl.
CPC .................... A63F 13/24 (2014.09)

(58) Field of Classification Search
None
See application file for complete search history.

(56) References Cited
U.S. PATENT DOCUMENTS
11,275,443 B1 * 3/2022 Tu .................... A63F 13/24
* cited by examiner Primary Examiner — Peter J Iannuzzi
(74) Attorney, Agent, or Firm — Norton Rose Fulbright US LLP

(57) ABSTRACT

An information handling system includes a memory and a processor coupled to the memory. The processor is configured to detect, during execution of a video game application, a gameplay event associated with the video game application. The processor is further configured to determine a mechanical resistance setting associated with an input device of a game controller and to determine one or more positions of the input device at which the mechanical resistance setting is to be applied. The mechanical resistance setting is associated with the gameplay event. The processor is further configured to send, to the game controller, a control signal indicating a configuration of the input device. The configuration is associated with the mechanical resistance setting and the one or more positions.

15 Claims, 8 Drawing Sheets

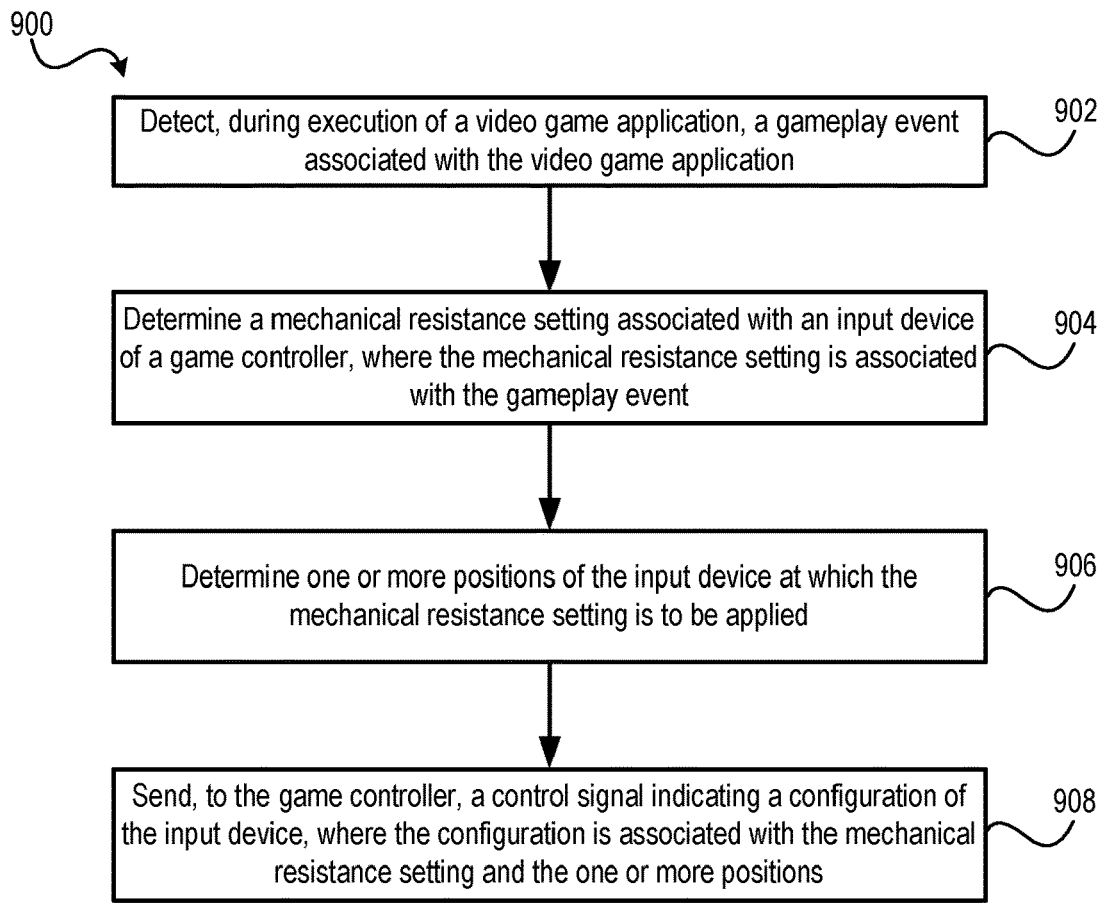

INPUT DEVICE CONFIGURATION OF A GAME CONTROLLER BASED ON DETECTION OF A GAMEPLAY EVENT

FIELD OF THE DISCLOSURE

This disclosure relates to information handling systems. More specifically, portions of this disclosure relate to information handling systems that determine a configuration for an input device of a game controller based on detection of a gameplay event.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of information handling systems include computing devices that execute video game applications. For example, a desktop computer, a laptop computer, a tablet, a mobile device, a server, or a gaming console may execute a video game application. Video game applications include single-user video games and multi-user video games (e.g., where multiple players compete or cooperate with one another), as well as virtual reality (VR) video games, augmented reality (AR) video games, and other types of video games.

During gameplay, a user may provide input to an information handling system via a game controller. Some video games may use a game controller that simulates certain conditions associated with a video game. For example, a game controller may generate audio, visual, or haptic feedback in order to enhance user experience of a video game. In some game controllers, such feedback may be implemented using circuitry that is relatively expensive, difficult to integrate into a controller with a small form factor, or both. Further, to provide a realistic user experience, the circuitry may be relatively specialized, which may cause a game controller to be incompatible with video games. As a result, some game controllers that offer a realistic user experience via feedback may be relatively expensive and may not be compatible with a variety of video games.

SUMMARY

In some aspects of the disclosure, an information handling system may determine a configuration of an input device of a game controller based on a gameplay event associated with a video game application executed by the information handling system. The configuration may be associated with a mechanical resistance setting (e.g., a force curve) of the input device and one or more positions (e.g., a range of positions) at which an adjustable resistance device of the game controller is to apply the mechanical resistance setting. The one or more positions may include one or more of a first position at which application of the mechanical resistance setting takes effect (also referred to herein as a start position, home position, or rest position) or a second position at which application of the mechanical resistance setting ceases (also referred to herein as an end position or stop position). In some examples, the configuration of the input device may be selected to simulate the gameplay event or to enhance user experience associated with the gameplay event.

To further illustrate, in some examples, the game controller may correspond to a light gun, the input device may include a trigger of the light gun, and the gameplay event may include selection of a type of firearm in the video game application. In such examples, the information handling system may change the "feel" and range of motion of the trigger based on the type of firearm. Other examples are also within the scope of the disclosure. For example, in some other implementations, the game controller may include or correspond to a gamepad, a joystick controller, a vehicle control simulation device (such as a racing wheel, a throttle quadrant, a control yoke, a flight simulator, or a vehicle pedal assembly), a musical instrument simulation device (such as a guitar controller), a mouse, a keyboard, a headset, a virtual reality (VR) device, or an augmented reality (AR) device, as illustrative examples.

By selecting the configuration of the input device based on the gameplay event, user experience may be enhanced. For example, by changing a mechanical resistance setting of the input device and one or more positions associated with the mechanical resistance setting based on the gameplay event, control of the input device may "feel" more realistic to a user as compared to some other conventional devices, such as devices that do not change resistance or range of positions during gameplay. Further, the configuration can be changed for different video games, which may enable a user to avoid purchasing multiple different types of game controllers for different video games.

In addition, in some aspects, different examples of the adjustable resistance device are disclosed. In some examples, the adjustable resistance device may include a motor and a gear that drive a set of counter rotating screws coupled to a shaft, which may apply an adjustable amount of mechanical resistance to the input device. In some other examples, the adjustable resistance device may include an actuator and a spring. The actuator may deflect the spring to apply an adjustable amount of mechanical resistance to the input device. In some additional examples, the adjustable resistance device may include a magnetorheological fluid (MRF) brake that applies an adjustable amount of mechanical resistance to the input device. Other examples are also within the scope of the disclosure.

To further illustrate, in some implementations of the adjustable resistance device, spring may have a movable mounting position that is adjustable by the actuator. The actuator may change a "feel" of the trigger during gameplay by adjusting the movable mounting position to change an amount of preloaded force associated with the spring. Further, in addition to applying mechanical resistance to user force applied to the trigger, the spring may actively "push back" or "bounce back" against the trigger (e.g., to bias the trigger in a particular position, such as a home position). As a result, the adjustable resistance device may enhance user experience during certain gameplay scenarios, such as gameplay scenarios in which the trigger may be biased or may bounce back to one or more positions that can be adjusted dynamically during gameplay based on one or more gameplay events.

BRIEF DESCRIPTION OF THE DRAWINGS

For a more complete understanding of the disclosed systems and methods, reference is now made to the following descriptions taken in conjunction with the accompanying drawings.

FIG. 9 is a flow chart of an example of another method of operation of an information handling system according to some aspects.

FIG. 10 is a flow chart of an example of a method of operation of a game controller according to some aspects.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Certain examples of information handling systems are described further below, such as with reference to FIG. 1.

Figure 1:
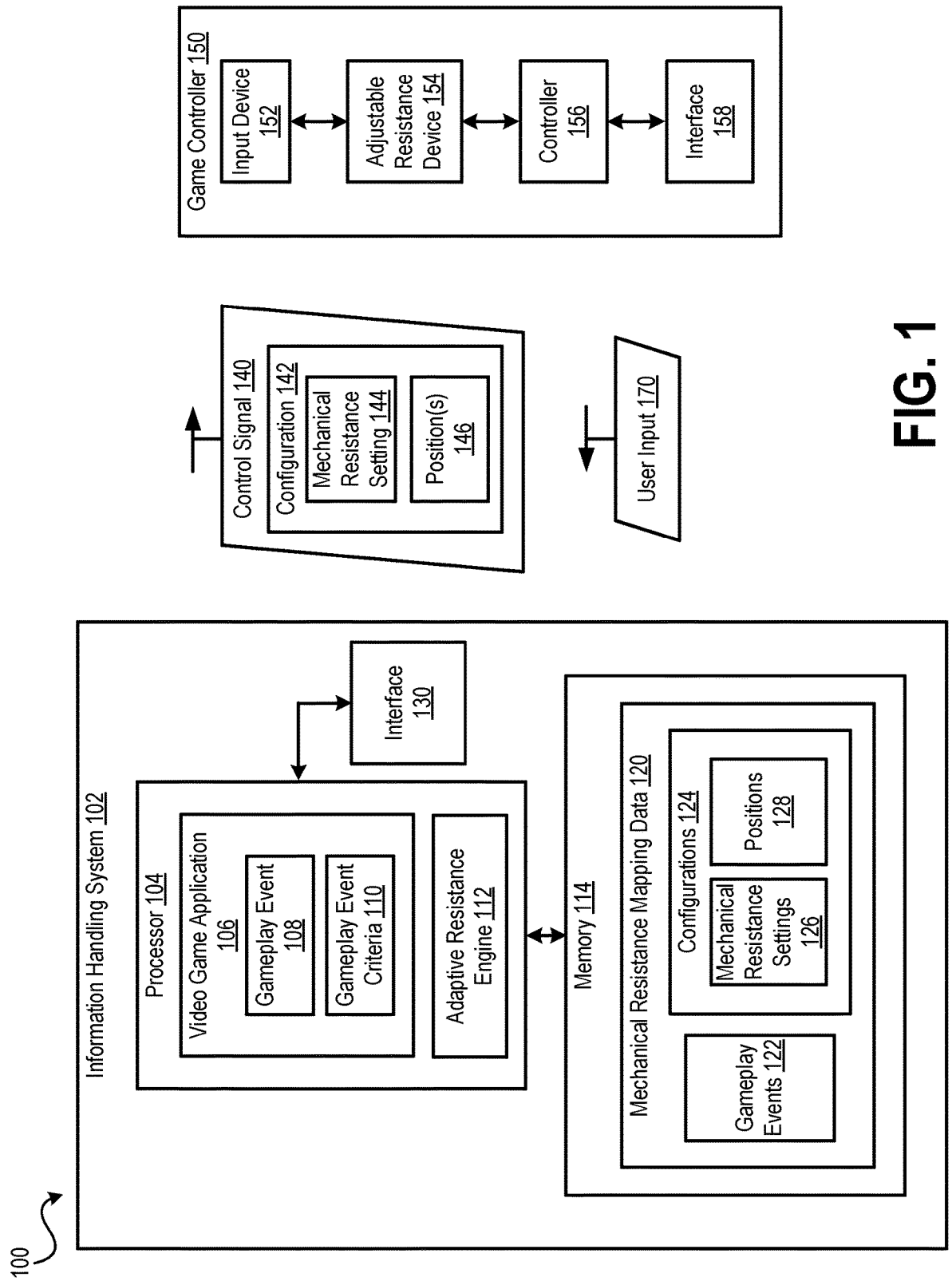
FIG. 1 is a block diagram illustrating an example of a system according to some aspects.

FIG. 1 is a block diagram illustrating an example of a system 100 according to some aspects. The system 100 includes an information handling system 102. In some implementations, the information handling system 102 may include or correspond to a computing device, such as a gaming console, a desktop computer, a laptop computer, a tablet, a mobile device, or a server (e.g., a cloud server), as illustrative examples.

The information handling system 102 may include one or more processors, such as a processor 104. The information handling system 102 may further include a memory 114 and an interface 130 (e.g., a wireless interface or a wired interface) that are coupled to the information handling system 102. The processor 104 may execute a video game application 106 (e.g., after retrieving the video game application 106 from the memory 114).

The system 100 may further include a game controller 150. The game controller 150 may include an input device 152, an adjustable resistance device 154, a controller 156, and an interface 158 (e.g., a wired interface or a wireless interface). The controller 156 may be coupled to one or more of the input device 152, the adjustable resistance device 154, or the interface 158. In some implementations, the game controller 150 may include or correspond to a gamepad, a joystick controller, a vehicle control simulation device (such as a racing wheel, a throttle quadrant, a control yoke, a flight simulator, or a vehicle pedal assembly), a weapon simulation device (such as a light gun), a musical instrument simulation device (such as a guitar controller), a mouse, a keyboard, a headset, a virtual reality (VR) device, or an augmented reality (AR) device, as illustrative examples.

The input device 152 may include or correspond to a button, a trigger, a lever, a throttle, a pedal, a knob, a joystick, a trackball, a wheel (such as a mouse wheel), or a yoke, as illustrative examples. In some examples, the input device 152 includes a transducer that generates, in response to movement of the input device 152 by a user, an electrical signal representing the movement. The adjustable resistance device 154 may provide an adjustable amount of mechanical resistance that opposes the movement, as described further below. As used herein, "mechanical resistance" may refer to or may include, for example, one or more of stiffness, tension, rigidity, spring force, spring torque, friction, damping, or viscosity associated with movement of the input device 152, which may be felt or perceived by a user in response to force applied to the input device 152 by the user. In some examples, mechanical resistance may be measured or indicated in newtons (N), newton meters (N-m), newton seconds per meter (Ns/m), newton seconds per square meter (N·s/m^2), or in another unit.

To further illustrate, in some examples, any of the information handling system 102, the game controller 150, and the display may communicate with one another via one or more networks. The one or more networks may include a local area network (LAN), a wireless LAN (WLAN), a wide area network (WAN), a wireless network (e.g., a cellular network), a wired network, the Internet, one or more other networks, or a combination thereof.

In some implementations, the processor 104 may execute an adaptive resistance engine 112 in connection with the video game application 106. In some examples, the adaptive resistance engine 112 may include a driver executable by the processor 104 to communicate with the game controller 150 and to adaptively change mechanical resistance associated with the input device 152 using one or more techniques described herein. Depending on the implementation, the adaptive resistance engine 112 may include one or more of a rules engine, a complex event processing system, a machine learning application, or a reinforcement learning application, as illustrative examples.

During operation, the processor 104 may execute the video game application 106. For example, the information handling system 102 may load the video game application 106 from the memory 114 and may execute the video game application 106 based on user input received via the game controller 150.

During gameplay of the video game application 106, the information handling system 102 may monitor for and may detect gameplay events associated with the video game application 106, such as a gameplay event 108 (e.g., a game state update). To illustrate, the processor 104 may detect one or more in-game events by monitoring one or more of audio content associated with the video game application 106, video content associated with the video game application 106, instructions of the video game application 106, operations initiated by executing instructions of the video game application 106, data generated by executing instructions of the video game application 106, user input associated with the video game application 106, or other criteria. As an illustrative example, the gameplay event 108 may correspond to or may include selection of (or a change of) a character played by a user during gameplay of the video game application 106, a weapon used during gameplay, a stage played during gameplay, or another gameplay event.

In some examples, the information handling system 102 may parse instructions of the video game application 106 and may analyze data retrieved (e.g., from the memory 114) to identify gameplay events. As an illustrative example, the processor 104 may receive user input specifying selection of a weapon usable during gameplay of the video game application 106. Based on the user input, the processor 104 may execute a particular set of instructions corresponding to the weapon. In some examples, the gameplay event 108 may correspond to selection of the weapon, and the processor 104 may detect the gameplay event 108 by detecting execution of the particular set of instructions corresponding to the weapon.

To further illustrate, the information handling system 102 may monitor gameplay of the video game application 106 for one or more gameplay event criteria 110. The information handling system 102 may detect the gameplay event 108 based on determining that the one or more gameplay event criteria 110 are satisfied. In some examples, the one or more gameplay event criteria 110 may include one or more of an identifier (e.g., name or title) of the video game application 106, a genre of the video game application 106, a gameplay state associated with gameplay of the video game application 106, a weapon associated with the gameplay, an item associated with the gameplay, a character associated with the gameplay, an ability of the character, a visual, audio, or haptic effect associated with the gameplay, a state associated with the weapon or the item, a cooldown effect associated with the gameplay, a terrain associated with the gameplay, a vehicle associated with the gameplay, or a state of the vehicle, as illustrative examples. Depending on the implementation, the information handling system 102 may monitor gameplay of the video game application 106 for the one or more gameplay event criteria 110 upon loading the video game application 106, during execution of the video game application 106, based on one or more other conditions, or a combination thereof.

In some examples, the gameplay event 108 may include user input from another user (e.g., a second user that is different than the user of the game controller 150), such as in connection with a multiplayer game. To illustrate, during gameplay, the second user may win the ability to affect control of the input device 152. In some examples of a "friend" scenario, the second user may decrease difficulty of using the input device 152 (such as by decreasing an amount of mechanical resistance provided by the adjustable resistance device 154). In some examples of a "foe" scenario, the second user may increase difficulty of using the input device 152 (such as by increasing an amount of mechanical resistance provided by the adjustable resistance device 154).

As will be appreciated, the video game application 106 may be associated with multiple different game phases, such as a boot-up or initiation phase (e.g., when the processor 104 loads the video game application 106 from the memory 114), a title screen phase (e.g., where a user is prompted to start gameplay), an introduction sequence (e.g., where a user is displayed an overview of a state), gameplay (e.g., where a user plays a stage or level), and other game phases. In various examples, the information handling system 102 may detect the gameplay event 108 dynamically during any of the different game phases of the video game application 106.

Based on detecting the gameplay event 108, the information handling system 102 may determine a configuration 142 associated with the gameplay event 108. The configuration 142 may include a mechanical resistance setting 144 associated with the input device 152 and one or more positions 146 at which the mechanical resistance setting 144 is to be applied. In some examples, the mechanical resistance setting 144 may indicate one or more mechanical resistance values as a function of position of the input device 152, such as a "resistance curve" or "force curve." As used herein, a resistance curve or force curve may include any type of function, such as a constant value, a linear function, a continuous function, a discontinuous function, or another type of function. In some examples, the adaptive resistance engine 112 may be contextually adaptive to select the configurations 142 based at least in part on contextual information, such as an identity of a player or user, an identifier or genre of the video game application 106, voice input from a user, one or more other inputs, or a combination thereof.

To illustrate, in some implementations, the adaptive resistance engine 112 may access mechanical resistance mapping data 120, which may be stored at the memory 114. The mechanical resistance mapping data 120 may indicate gameplay events 122 (such as the gameplay event 108) and configurations 124 (such as the configuration 142) associated with the gameplay events 122. For example, each configuration of the configurations 124 may be associated with one or more of the gameplay events 122. The configurations 124 may indicate mechanical resistance settings 126 (which may include mechanical resistance setting 144) and positions 128 (which may include the one or more positions 146) associated with the mechanical resistance settings 126. In some examples, the memory 114 may store multiple sets of configurations (e.g., where the configuration 124 corresponds to one set of the multiple sets). In such examples, each set of configurations may correspond to a different respective video game, a different type (or genre) of video game, a different respective user (e.g., where users may customize the "feel" of the input device 152), or a different respective game controller, as illustrative examples.

The information handling system 102 may use the mechanical resistance mapping data 120 to determine the configuration 142 based on the gameplay event 108. For example, after detecting the gameplay event 108, the processor 104 may access the mechanical resistance mapping data 120 and may select the configuration 142 from among the configurations 124 based on the gameplay event 108. In some implementations, the mechanical resistance mapping data 120 may include or may correspond to a lookup table (LUT) that is indexed by the gameplay events 122.

After determining the configuration 142, the information handling system 102 may send a control signal 140 to the game controller 150 indicating the configuration 142. In some implementations, the information handling system 102 may transmit the control signal 140 via a wired medium (such as a bus or wire), and the game controller 150 may have a wired connection to the information handling system 102 (e.g., where the interfaces 130, 158 correspond to wired interfaces). Alternatively or in addition, the information handling system 102 may transmit the control signal 140 via a wireless medium (such as a WLAN or a cellular network), and the game controller 150 may have a wireless connection to the information handling system 102 (e.g., where the interfaces 130, 158 correspond to wireless interfaces). Alternatively or in addition, the information handling system 102 may transmit the control signal 140 via a packet-switched network (such as the Internet), and the game controller 150 may have a packet-switched connection to the information handling system 102 (e.g., where the interfaces 130, 158 correspond to packet-switched interfaces, such as Internet Protocol (IP) modems).

In some examples, the configuration 142 may correspond to an initial or default configuration of the input device 152 (e.g., where the information handling system 102 provides the configuration 142 to the game controller 150 upon initiation or loading of the video game application 106 from the memory 114). In some other examples, the configuration 142 may correspond to a feedback configuration of the input device 152 (e.g., where the information handling system 102 provides the configuration 142 to the game controller 150 based on user input in connection with the video game application 106).

The game controller 150 may identify the mechanical resistance setting 144 and the one or more positions 146 based on the control signal 140. For example, in some implementations, the control signal 140 may explicitly indicate one or more of the mechanical resistance setting 144 and the one or more positions 146. In some other examples, the control signal 140 may include an index value associated with the configuration 142, and the game controller 150 may identify the configuration 142 based on the index value (e.g., using the mechanical resistance mapping data 120).

The game controller 150 may apply the mechanical resistance setting 144 to the input device 152 based on the one or more positions 146. For example, the game controller 150 may use the adjustable resistance device 154 to apply an amount of mechanical resistance specified by the mechanical resistance setting 144 to the input device 152 at the one or more positions 146.

The game controller 150 may receive user control of the input device 152. For example, in some implementations, the input device 152 may include or correspond to a trigger, and the adjustable resistance device 154 may apply mechanical resistance to the trigger at the one or more positions 146 based on the mechanical resistance setting 144. In such examples, the user control of the input device 152 may correspond to a trigger throw motion of the trigger, where a user supplies force, through the one or more positions 146, sufficient to overcome the mechanical resistance applied by the adjustable resistance device 154.

In some examples, the game controller 150 includes one or more transducers configured to generate a signal representing the user control of the input device 152. For example, the signal may indicate one or more of an amount of force supplied to the input device 152, a velocity of the input device 152, an acceleration of the input device 152, an initial position of the input device 152, or a final position of the input device 152.

The game controller 150 may transmit a message to the information handling system 102 based on the user control of the input device 152, such as user input 170. For example, the user input 170 may indicate one or more of an amount of force supplied to the input device 152, a velocity of the input device 152, an acceleration of the input device 152, an initial position of the input device 152, or a final position of the input device 152.

The information handling system 102 may receive the user input 170 and may perform one or more operations in connection with the video game application 106 based on the user input 170. As an example, the user input 170 may correspond to firing of a weapon. In such examples, the processor 104 may execute the video game application 106 to generate a representation of a result of firing the weapon (such as video and audio corresponding to gunfire).

Although certain examples have been described, other examples are also within the scope of the disclosure. For example, in some implementations, the configuration 142 may correspond to a haptic vibration pattern that is generated by the game controller 150 (e.g., using a haptic feedback device that may be included in the game controller 150). In some examples, gameplay event 108 may correspond to a damage indicator (such as a "hit" to a character), and mechanical resistance associated with the input device 152 may change based on the damage indicator. In some other examples, the gameplay event 108 may correspond to setting of cruise control during gameplay, and the configuration 142 may hold the input device 152 (e.g., a pedal of a vehicle simulation device) in a particular position. Other implementations may use one or more of a combinatorial context, a speed-running scheme, a macro, audio feedback, visual feedback, or haptic feedback.

Figure 2:
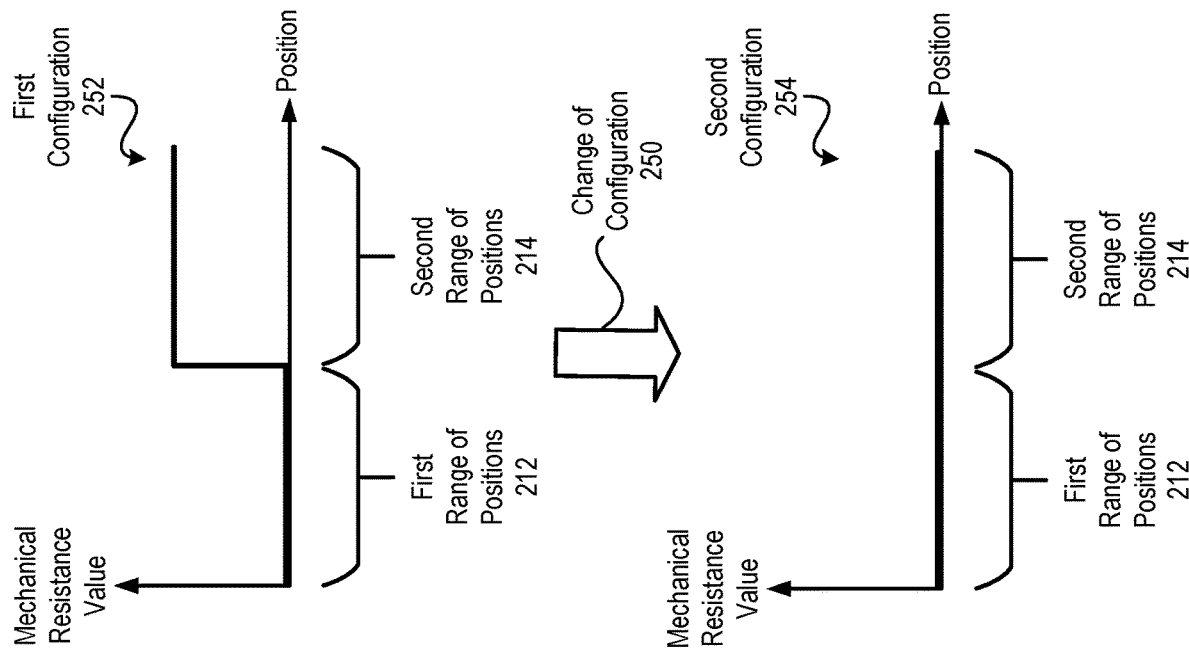
FIG. 2 illustrates an example of a change of configuration of a trigger from a first configuration to a second configuration according to some aspects of the disclosure.
Figure 2:
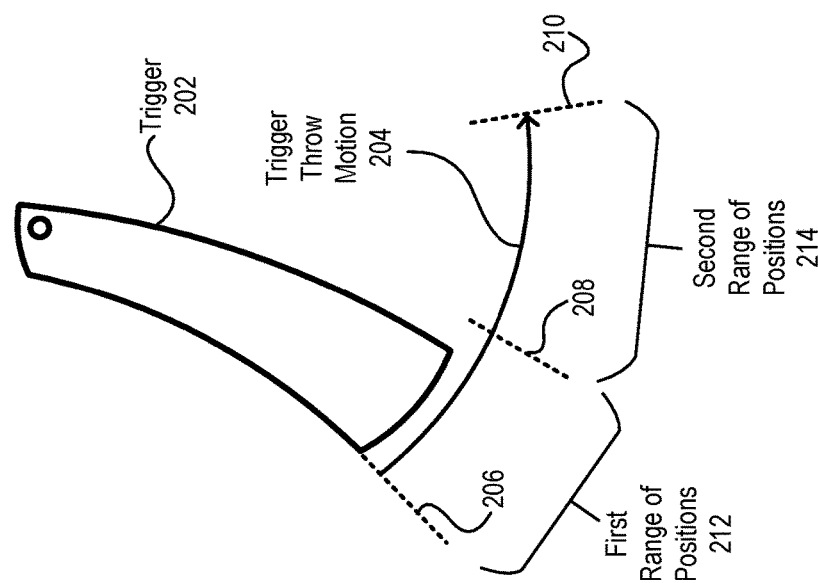

FIG. 2 illustrates an example of a change of configuration 250 of a trigger 202 from a first configuration 252 to a second configuration 254 according to some aspects of the disclosure. In some examples, the trigger 202 may correspond to or may be included in the input device 152 of the game controller 150 of FIG. 1. The first configuration 252 and the second configuration 254 may each be associated with an abscissa that may indicate positions of the trigger 202 and may each be associated with an ordinate that may indicate one or more mechanical resistance values corresponding to an adjustable resistance setting.

In some examples, the configuration 142 of FIG. 1 may correspond to the first configuration 252, and the second configuration 254 may correspond to another of the configurations 124. In such examples, the mechanical resistance setting 144 may correspond to the mechanical resistance values specified by the first configuration 252. In some other examples, the configuration 142 of FIG. 1 may correspond to the second configuration 254, and the first configuration 252 may correspond to another of the configurations 124. In such examples, the mechanical resistance setting 144 may correspond to the mechanical resistance values (or value) specified by the second configuration 254.

The trigger 202 may be movable within a set of positions corresponding to a trigger throw motion 204. For example, the set of positions may include a position 206, a position 210, and positions from the position 206 to the position 210. In some examples, the one or more positions 146 are selected from the set of positions corresponding to the trigger throw motion 204.

The first configuration 252 may be associated with a first range of positions 212 (e.g., from the position 206 to a position 208) and one or more first mechanical resistance values. The first configuration 252 may be associated with a second range of positions 214 (e.g., from the position 208 to the position 210) and one or more second mechanical resistance values. In the example of FIG. 2, the first configuration 252 may include a "step" function, where the one or more first mechanical resistance values correspond to a first value (e.g., zero or approximately zero), and where the one or more second mechanical resistance values correspond to a second value greater than the first value. Other examples are also within the scope of the disclosure.

To illustrate, in some examples, a user may depress the trigger 202 through the first range of positions 212 with relatively little (or no) mechanical resistance. At the position 208, the user may be met with an increase in mechanical resistance associated with the trigger 202. In some implementations, pressing the trigger 202 through the first range of positions 212 may initiate a first operation associated with the video game application 106, and pressing the trigger 202 through the second range of positions 212 may initiate a second operation associated with the video game application 106. As a non-limiting example, the first operation may include "sighting" a target (such as by adding a crosshair, target overlay, or sniper scope to graphics content of the video game application 106), and the second operation may include firing a weapon at the target. Other examples are also within the scope of the disclosure.

The second configuration 254 may be associated one or more different mechanical resistance values as compared to the first configuration 252. For example, in the second configuration 254, both the first range of positions 212 and the second range of positions 214 may be associated with the same mechanical resistance value (e.g., zero or approximately zero). As a non-limiting example, after a weapon is depleted of ammunition, the information handling system 102 may perform the change of configuration 250 from the first configuration 252 to the second configuration 254. In such examples, the second configuration 254 of the trigger 202 may indicate to a user that the weapon is depleted of ammunition.

To further illustrate, in some aspects of the disclosure, the one or more positions 146 of FIG. 1 may include one or more of a first position at which application of the mechanical resistance setting 144 takes effect (also referred to herein as a start position, home position, or rest position) and may further include a second position at which application of the mechanical resistance setting 144 ceases (also referred to herein as an end position or stop position). For example, the first position may correspond to the position 208, and the second position may correspond to the position 210.

In some aspects, the control signal 140 may indicate a change of the first position based on the gameplay event 108, such as by changing the first position from one of the positions 206, 208 to the other of the positions 206, 208. To illustrate, the gameplay event 108 may include receiving user input specifying a change of one type of weapon to another type of weapon, and the information handling system 102 may change the first position from one of the positions 206, 208 to the other of the positions 206, 208 via the control signal 140. As a non-limiting example, a user may provide user input indicating a change from a first weapon with a first trigger feel (e.g., a trigger feel with less "slack" or "play") to a second weapon with a second trigger feel (e.g., a trigger feel with more slack or play). In some such examples, the information handling system 102 may change the first position from the position 206 to the position 208 (e.g., to "firm up" the trigger 202 so that the trigger 202 has more slack in the trigger throw motion 204).

Alternatively or in addition, the control signal 140 may indicate a change of the second position based on the gameplay event 108, such as by changing the second position from one of the positions 208, 210 to the other of the positions 208, 210. To illustrate, the gameplay event 108 may include receiving user input specifying a change of one type of weapon to another type of weapon, and the information handling system 102 may change the second position from one of the positions 208, 210 to the other of the positions 208, 210 via the control signal 140. As a non-limiting example, a user may provide user input indicating a change from a weapon with a first trigger throw range (e.g., a hair trigger throw range) to a weapon with a second trigger throw range that is greater than the first trigger throw range. In some such examples, the information handling system 102 may change the first position from the position 208 to the position 210 (e.g., to increase a range of the trigger throw motion 204 from the first range of positions 212 to a combination of the first range of positions 212 and the second range of positions 214).

Alternatively or in addition, the control signal 140 may indicate a change of the mechanical resistance setting 144, such as by changing one or more mechanical resistance values applied by the adjustable resistance device 154 through at least some positions of the trigger throw motion 204. To illustrate, the gameplay event 108 may include receiving user input specifying a change of one type of weapon to another type of weapon, and the information handling system 102 may change an amount of mechanical resistance applied through the trigger throw motion 204 via the control signal 140. As a non-limiting example, a user may provide user input indicating a change from a first weapon with a first trigger feel (e.g., a "firm" trigger feel) to a second weapon with a second trigger feel (e.g., a "loose" trigger feel). In some such examples, the information handling system 102 may reduce (e.g., via the control signal 140) an amount of mechanical resistance applied to the trigger 202.

In some examples, the configuration 142 (or another configuration) may correspond to a "lock-out" of the trigger 202. For example, the trigger 202 may be disabled based on unavailability of an item, such as running out of ammunition or a gun jam event.

By selecting the configuration 142 of the input device 152 based on the gameplay event 108, user experience may be enhanced. For example, by changing the mechanical resistance setting 144 and the one or more positions 146 based on the gameplay event 108, control of the input device 152 may "feel" more realistic to a user as compared to some other conventional devices, such as devices that do not change resistance or range of positions during gameplay. Further, the configuration 142 can be changed for different video games, which may enable a user to avoid purchasing multiple different types of game controllers for different video games.

Figure 3:
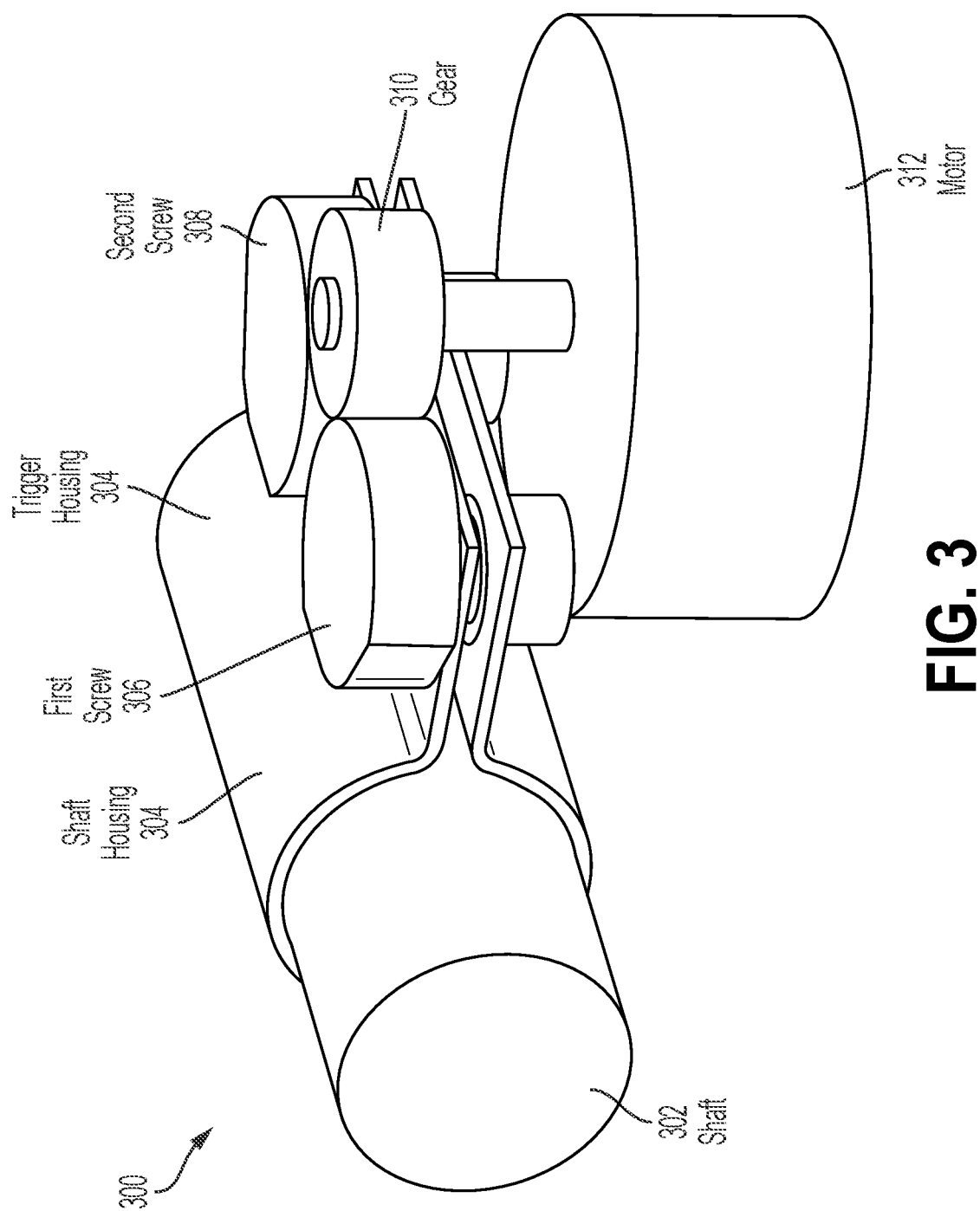
FIG. 3 is a diagram illustrating an example of an adjustable resistance device according to some aspects.

FIG. 3 is a diagram illustrating an example of an adjustable resistance device 300 according to some aspects. In some examples, the adjustable resistance device 300 corresponds to the adjustable resistance device 154 of FIG. 1. The adjustable resistance device 300 may correspond to a friction brake device.

The adjustable resistance device 300 may include a shaft 302 and a shaft housing 304 that at least partially encloses (or houses) the shaft 302. The shaft 302 may be coupled to or in contact with the input device 152. For example, the shaft 302 may be coupled to or in contact with the trigger 202 of FIG. 2.

The adjustable resistance device 300 may further include a motor 312, such as a servomotor. The motor 312 may be coupled to the controller 156 of FIG. 1, which may control operation of the motor 312. The adjustable resistance device may further include a gear 310 coupled to the motor 312, a first screw 306 (e.g., a left-threaded screw) coupled to the gear 310, and a second screw 308 (e.g., a right-threaded screw) coupled to the gear 310. In some examples, the first screw 306 and the second screw 308 may correspond to a set of counter rotating screws that are coupled to the shaft 302 (e.g., via a clamping band). The shaft 302 may apply mechanical resistance to the input device 152 (e.g., the trigger 202) based on clamping force generated by the set of screws.

During operation, the motor 312 may rotate the gear 310 (e.g., based on a command from the controller 156). The gear 310 may rotate the first screw 306 and the second screw 308. Rotation of the first screw 306 and the second screw 308 may adjust a position of the shaft 302.

The motor 312 may operate based on the configuration 142 indicated by the information handling system 102. For example, an amount of mechanical resistance associated with the input device 152 may be changed by applying more or less force to the shaft via the motor 312. To further illustrate, to increase the amount of mechanical resistance, the motor 312 may drive the first screw 306 and the second screw 308 in a first pair of directions (e.g., clockwise and counterclockwise, respectively), which may increase a clamping pressure applied to the shaft 302. To decrease the amount of mechanical resistance, the motor 312 may drive the first screw 306 and the second screw 308 in a second pair of directions (e.g., counterclockwise and clockwise, respectively), which may decrease the clamping pressure applied to the shaft 302.

As another example, the motor 312 may determine a start position or an end position of a range of positions (such as the positions of the trigger throw motion 204) by "locking" or "clamping" the gear 310 in position. For example, to implement a trigger throw motion 204 having the first range of positions 212, the motor 312 may inhibit the gear 310 from rotating outside the positions 206, 208 (while allowing movement of the gear 310 in between the positions 206, 208). As another example, to implement a trigger throw motion 204 having the second range of positions 214, the motor 312 may inhibit the gear 310 from rotating outside the positions 208, 210 (while allowing movement of the gear 310 in between the positions 208, 210).

In some examples, implementation of the adjustable resistance device 300 of FIG. 3 may enhance operation of a game controller, such as the game controller 150. To illustrate, in some implementations, the adjustable resistance device 300 may enable application of a relatively large amount of mechanical resistance to the trigger 202 (e.g., by using the motor 312 to "lock" the first screw 306 and the second screw 308 in a position or in a range of positions). As a result, the adjustable resistance device 300 may enhance user experience during certain gameplay scenarios, such as gameplay scenarios in which the trigger 202 may be "locked" or disabled.

Figure 4:
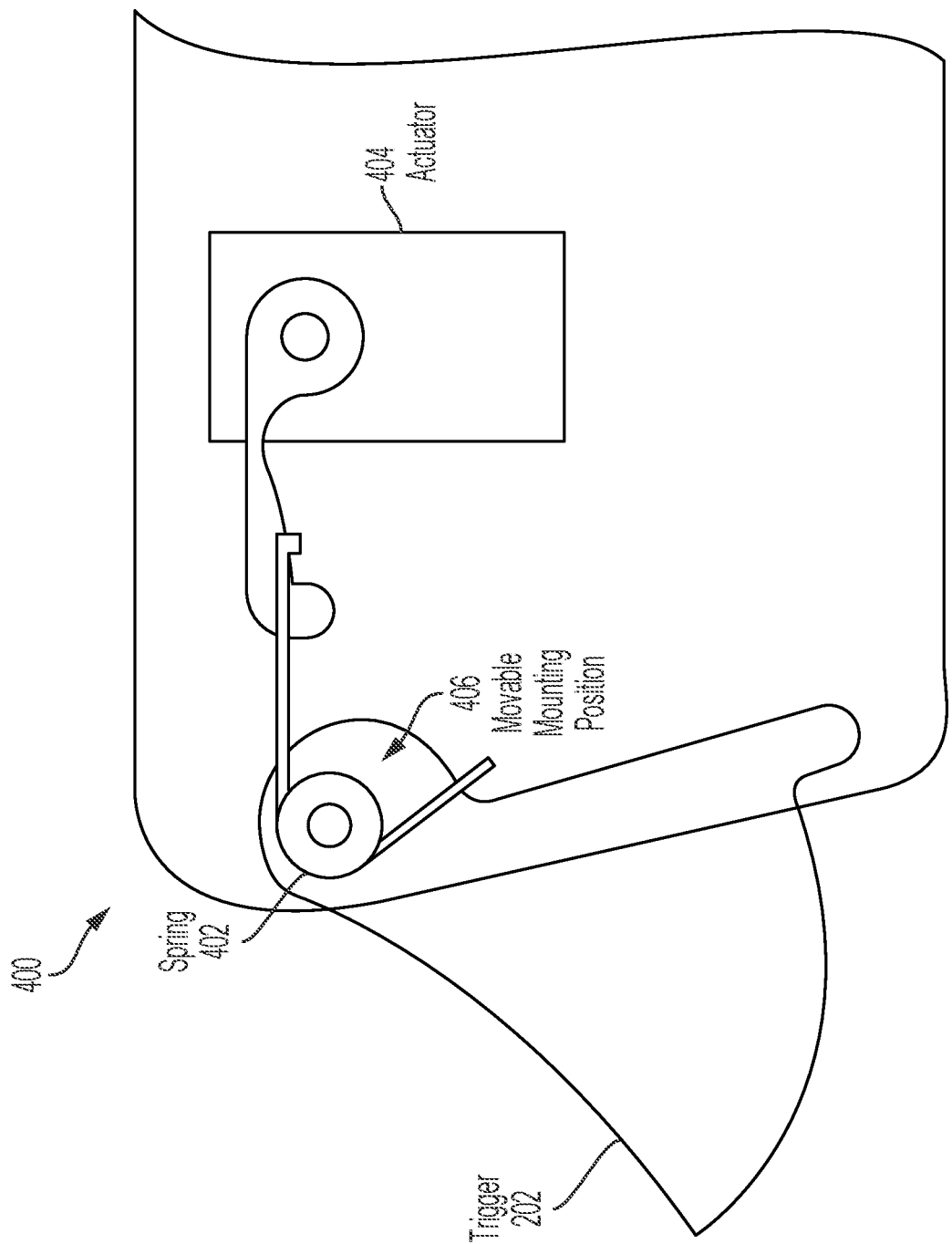
FIG. 4 is a diagram illustrating another example of an adjustable resistance device according to some aspects.

FIG. 4 is a diagram illustrating another example of an adjustable resistance device 400 according to some aspects. In some examples, the adjustable resistance device 400 corresponds to the adjustable resistance device 154 of FIG. 1. The adjustable resistance device 400 may correspond to an adjustable spring preload device.

The adjustable resistance device 400 may include a spring 402 (e.g., a torsion spring) and an actuator 404 (e.g., a servomotor) coupled to the spring 402. The actuator 404 may be coupled to the controller 156 of FIG. 1. The spring 402 may be coupled to the input device 152 (such as the trigger 202 or another input device).

During operation, the actuator 404 may operate based on the configuration 142 indicated by the information handling system 102. For example, the actuator 404 may cause deflection of the spring 402 based on the configuration 142. The spring 402 may apply mechanical resistance to the input device 152 (such as the trigger 202 or another input device) based on the deflection. Further, in addition to applying mechanical resistance to force applied to the trigger 202, the spring 402 may actively "push back" against the trigger 202 (e.g., to bias the trigger 202 in a particular position, such as the position 206).

In some implementations, the actuator 404 is configured to adjust a position of the spring 402 to change a range of positions associated with the trigger 202. To illustrate, the spring 402 may have a movable mounting position 406 that is adjustable by the actuator 404. The actuator may cause deflection of the spring by adjusting the movable mounting position 406 (e.g., leftward or rightward in FIG. 4) based on the configuration 142, which may change an amount of preloaded force associated with the spring 402.

In some examples, the adjustable resistance device 400 (or another adjustable resistance device described herein) may be used during an initialization or calibration stage (e.g., a "pre-game" calibration stage) of gameplay. For example, prior to playing a stage, a user may be prompted to calibrate the trigger 202 by applying force to the trigger 202. The game controller 150 may detect an amount of force applied to the trigger 202 and may transmit a message to the information handling system 102 indicating the amount of force. In some implementations, receipt of the message by the information handling system 102 may correspond to the gameplay event 108.

In some examples, implementation of the adjustable resistance device 400 of FIG. 4 may enhance operation of a game controller, such as the game controller 150. To illustrate, in some implementations, the adjustable resistance device 400 may change an amount of preloaded deflection associated with the spring 402 based on the movable mounting position 406. Further, in addition to applying mechanical resistance to force applied to the trigger 202, the spring 402 may actively "push back" against the trigger 202 (e.g., to bias the trigger 202 in a particular position, such as the position 206). As a result, the adjustable resistance device 400 may enhance user experience during certain gameplay scenarios, such as gameplay scenarios in which the trigger 202 may be "biased" to one or more positions.

Figure 5:
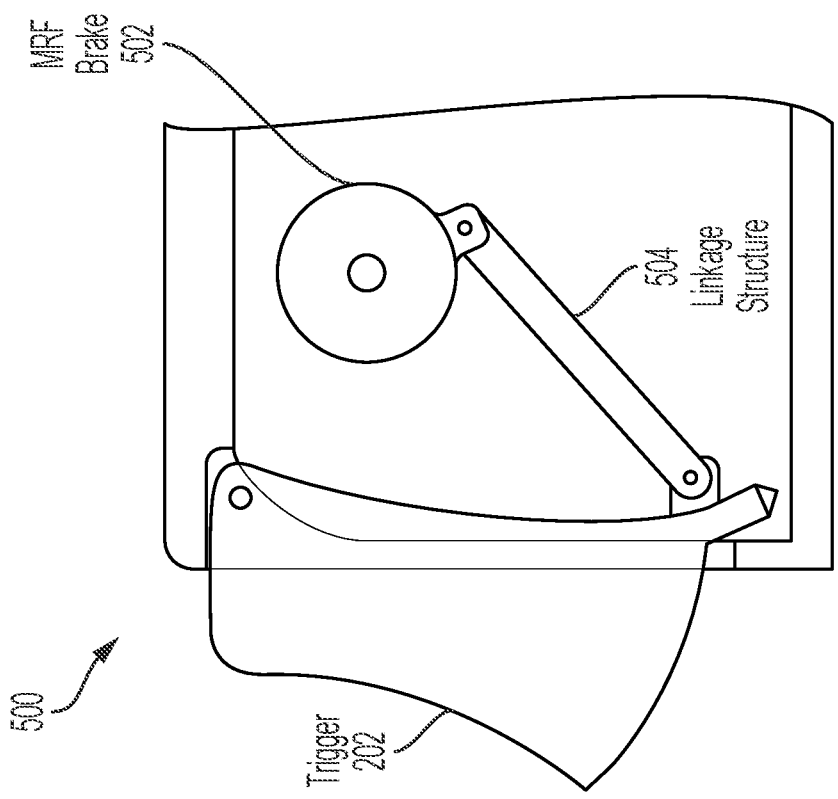
FIG. 5 is a diagram illustrating another example of an adjustable resistance device and the trigger of FIG. 2 according to some aspects.

FIG. 5 is a diagram illustrating another example of an adjustable resistance device 500 and the trigger 202 according to some aspects. In some examples, the adjustable resistance device 500 corresponds to the adjustable resistance device 154 of FIG. 1. The adjustable resistance device 500 may correspond to a magnetorheological fluid (MRF) damper device.

The adjustable resistance device 500 may include an MRF brake 502 and a linkage structure 504. The linkage structure 504 may be coupled to the MRF brake 502 and to the input device 152 (such as the trigger 202 or another input device).

During operation, the MRF brake 502 may operate based on the configuration 142 indicated by the information handling system 102. For example, the MRF brake 502 may apply resistive torque to the input device 152 (such as the trigger 202 or another input device) via the linkage structure 504 based on the configuration 142. In some examples, the MRF brake 502 may include a chamber, a fluid within the chamber, and particles (e.g., metal particles) disposed within the fluid. The MRF brake 502 may further include one or more coils that generate a magnetic field to magnetize the particles, which may solidify (or partially solidify) the fluid to generate mechanical resistance. Alternatively or in addition, the MRF brake 502 may generate haptic feedback events at the game controller 150, such as by activating and deactivating the magnetic field based on a sequence or pattern. In some examples, the sequence or pattern is specified by the configuration 142.

In some examples, implementation of the adjustable resistance device 500 of FIG. 5 may enhance operation of a game controller, such as the game controller 150. To illustrate, in some implementations, the adjustable resistance device 500 may enable dynamic change of feel of the trigger 202 and may further enable haptic feedback events at the game controller 150.

Figure 6:
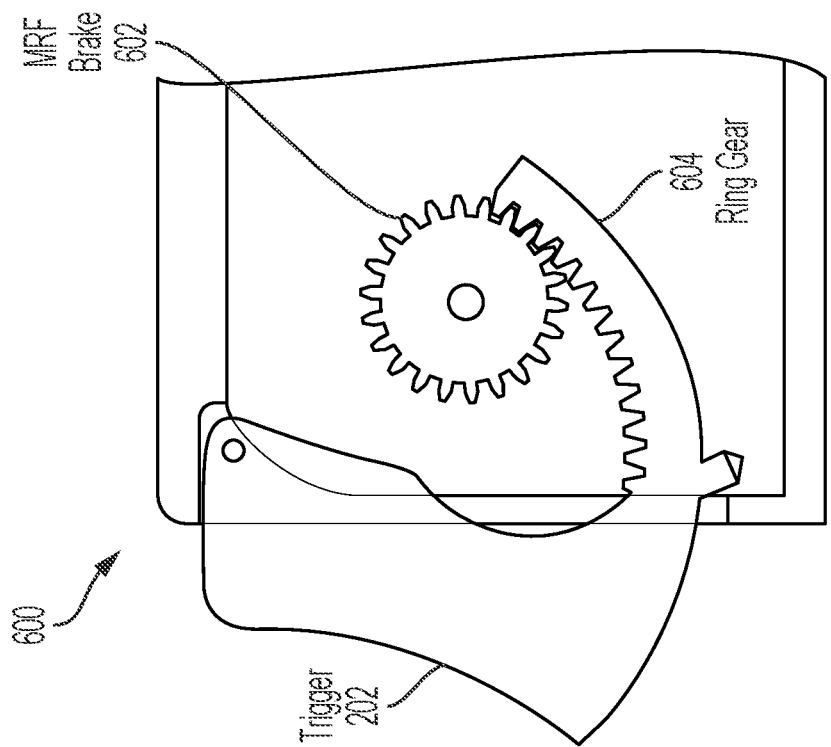
FIG. 6 is a diagram illustrating another example of an adjustable resistance device and the trigger of FIG. 2 according to some aspects.

FIG. 6 is a diagram illustrating another example of an adjustable resistance device 600 and the trigger 202 according to some aspects. In some examples, the adjustable resistance device 600 corresponds to the adjustable resistance device 154 of FIG. 1. The adjustable resistance device 600 may correspond to an MRF damper device.

The adjustable resistance device 600 may include an MRF brake 602 and a ring gear 604. The ring gear 604 may be coupled to the MRF brake 602 and to the input device 152 (such as the trigger 202 or another input device).

During operation, the MRF brake 602 may operate based on the configuration 142 indicated by the information handling system 102. For example, the MRF brake 602 may apply resistive torque to the input device 152 (such as the trigger 202 or another input device) via the ring gear 604 based on the configuration 142. In some examples, the MRF brake 602 may include a chamber, a fluid within the chamber, and particles (e.g., metal particles) disposed within the fluid. The MRF brake 602 may further include one or more coils that generate a magnetic field to magnetize the particles, which may solidify (or partially solidify) the fluid to generate mechanical resistance. Alternatively or in addition, the MRF brake 602 may generate haptic feedback events at the game controller 150, such as by activating and deactivating the magnetic field based on a sequence or pattern. In some examples, the sequence or pattern is specified by the configuration 142.

In some examples, implementation of the adjustable resistance device 600 of FIG. 6 may enhance operation of a game controller, such as the game controller 150. To illustrate, in some implementations, the adjustable resistance device 600 may enable dynamic change of feel of the trigger 202 and may further enable haptic feedback events at the game controller 150.

Figure 7:
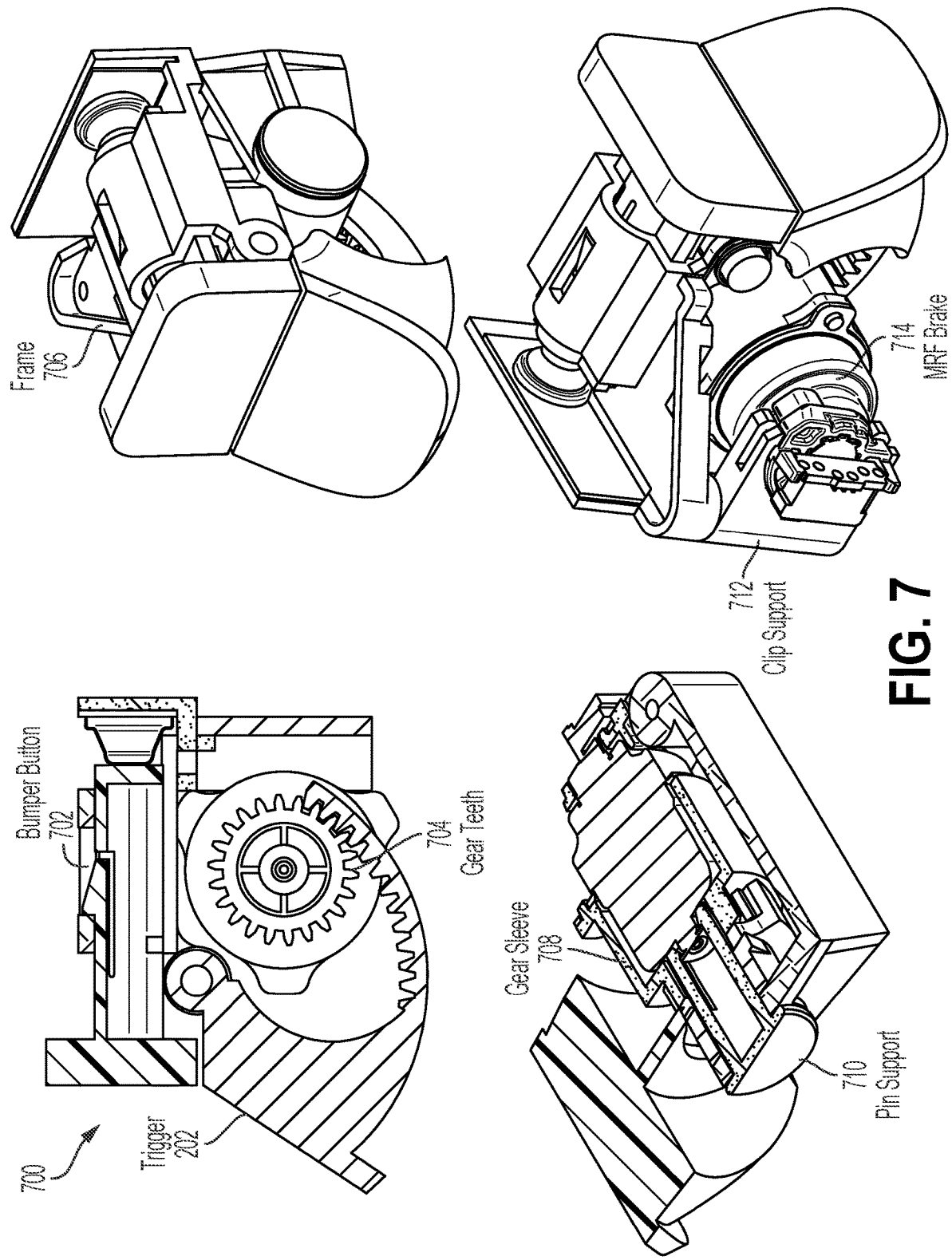
FIG. 7 is a diagram illustrating multiple views of another example of an adjustable resistance device and the trigger of FIG. 2 according to some aspects.

FIG. 7 is a diagram illustrating multiple views of another example of an adjustable resistance device 700 and the trigger 202 according to some aspects. In some examples, the adjustable resistance device 700 corresponds to the adjustable resistance device 154 of FIG. 1.

The example of FIG. 7 illustrates that the adjustable resistance device 700 may include a bumper button 702. In some examples, the bumper button 702 and the trigger 202 are coupled to (e.g., secured to) a frame 706 of the adjustable resistance device 700. A pin support 710 may support one or more structures of the adjustable resistance device 700. For example, the adjustable resistance device 700 may include an MRF brake 714 (e.g., the MRF brake 602 of FIG. 6, or another MRF brake), and the pin support 710 may be coupled to the MRF brake 714 (e.g., based on a snap-on attachment to the MRF brake 714).

The adjustable resistance device 700 may further include a gear sleeve 708. In some implementations, the gear sleeve 708 may constrain or limit motion of gear teeth 704, such as by keeping the gear teeth 704 away from the MRF brake 714 (e.g., to a location where a pitch circle may be reduced). A frame 706 of the adjustable resistance device 700 may be coupled to a chassis of the game controller 150. A clip support 712 may be coupled to the MRF brake 714 and to the frame 706. The clip support 712 may be supported, at least in part, by the pin support 710.

Figure 8:
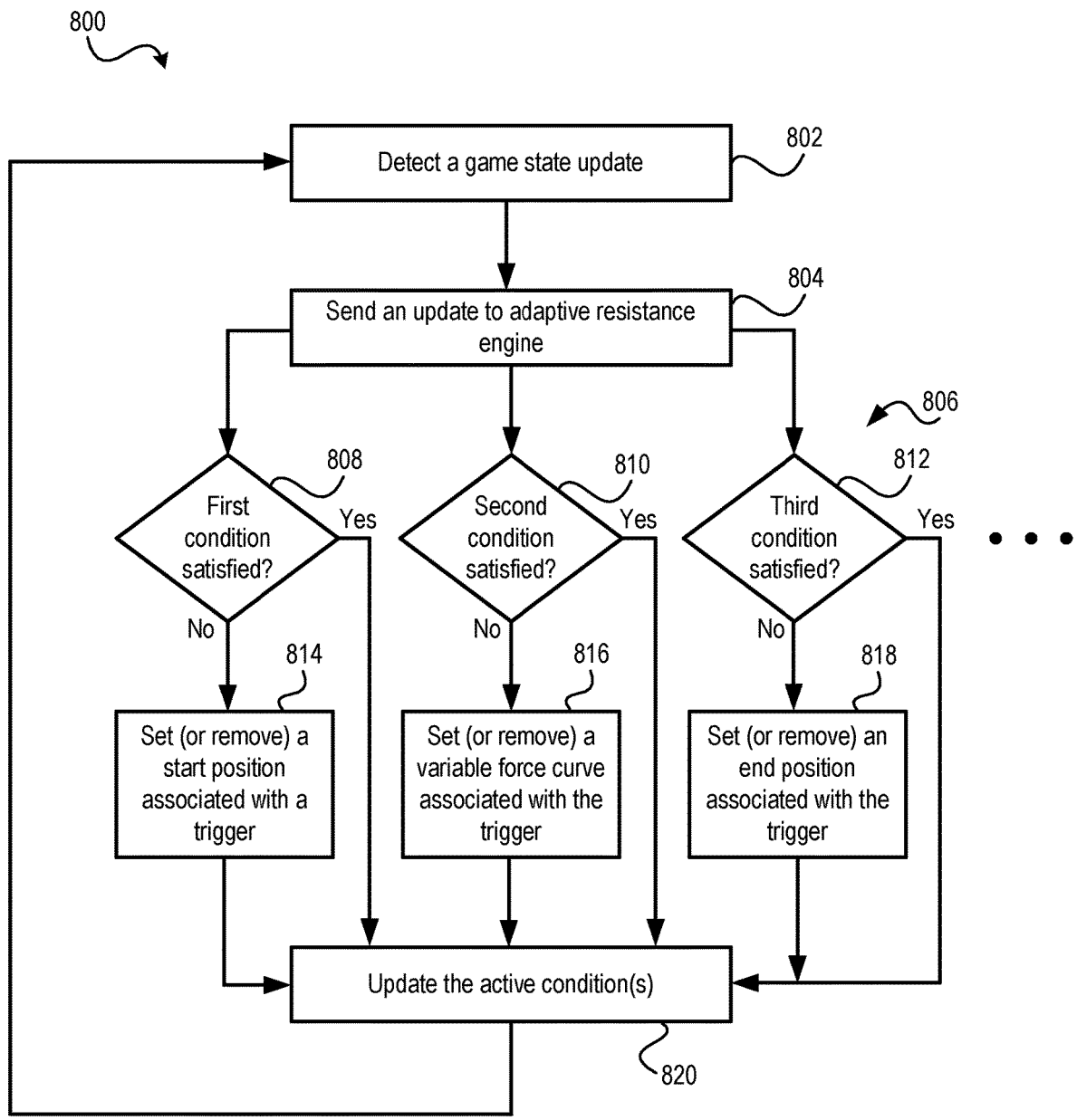
FIG. 8 is a flow chart of an example of a method 800 of operation of an information handling system according to some aspects.

FIG. 8 is a flow chart of an example of a method 800 of operation of an information handling system according to some aspects. In some examples, the method 800 may be performed by the information handling system 102 of FIG. 1, such as by the processor 104.

The method 800 may include detecting a game state update, at 802. For example, the game state update may correspond to the gameplay event 108. In some examples, the information handling system 102 may detect the game state update based on a determination that the one or more gameplay event criteria 110 are satisfied. As an illustrative example, the game state update may correspond to user selection of an item (e.g., a weapon) during gameplay of the video game application 106. To further illustrate, the game state update may correspond to user selection of a firearm among different firearms each having one or more respective mechanical resistance values and each having a respective trigger throw range.

The method 800 may further include sending the game state update to an adaptive resistance engine, at 804. For example, the processor 104 may send the game state update to the adaptive resistance engine 112 of FIG. 1 to cause the adaptive resistance engine 112 to perform one or more operations described herein.

The method 800 may further include checking one or more active conditions, at 806. The one or more active conditions may correspond to a set of one or more currently configured conditions associated with the input device 152. In some implementations, the adaptive resistance engine 112 may maintain a state machine storing a value indicating the one or more currently configured conditions of the input device 152.

For example, checking the one or more active conditions may include determining whether a first condition is satisfied, at 808. In some examples, checking whether the first condition is satisfied may include determining whether a particular game condition is satisfied, such as if a user has obtained a weapon. If the first condition is satisfied, the method 800 may continue, at 820. If the first condition is not satisfied, the method 800 may include setting (or removing) a start position associated with the trigger, at 814, and the method 800 may continue, at 820. To further illustrate, prior to the user selecting or obtaining a weapon during gameplay, the trigger 202 may be inoperable or "locked out" (e.g., where the user is unable to operate the trigger 202 due to a large amount of mechanical resistance at the beginning of the trigger throw motion 204).

As another example, checking the one or more active conditions may include determining whether a second condition is satisfied, at 810. In some examples, checking whether the second condition is satisfied may include determining whether a weapon has been selected or obtained. If the second condition is satisfied, the method 800 may continue, at 820. If the second condition is not satisfied, the method 800 may include setting (or removing) a mechanical resistance setting associated with the trigger, at 816, and the method 800 may continue, at 820. To further illustrate, upon selecting or obtaining a weapon during gameplay, a force curve associated with the weapon may be provided to the game controller 150.

As an additional example, checking the one or more active conditions may include determining whether a third condition is satisfied, at 812. In some examples, checking whether the third condition is satisfied may include determining whether a weapon is out of ammunition. If the third condition is satisfied, the method 800 may continue, at 820. If the third condition is not satisfied, the method 800 may include setting (or removing) an end position associated with the trigger, at 818, and the method 800 may continue, at 820. To illustrate, upon running out of ammunition, the adjustable resistance device 154 may reduce or remove mechanical resistance from the input device 152 (e.g., so that the trigger 202 feels "empty" or "loose").

The method 800 may include updating the one or more active conditions, at 820. For example, the adaptive resistance engine 112 may update state machine maintained by the adaptive resistance engine 112 from a first value indicating the previous conditions associated with the trigger 202 to a second value indicating the current conditions associated with the trigger 202.

FIG. 9 is a flow chart of an example of another method 900 of operation of an information handling system according to some aspects. In some examples, the method 800 may be performed by the information handling system 102 of FIG. 1, such as by the processor 104.

The method 900 includes detecting, by the information handling system during execution of a video game application, a gameplay event associated with the video game application, at 902. For example, the information handling system 102 may detect the gameplay event 108.

The method 900 further includes determining, by the information handling system, a mechanical resistance setting associated with an input device of a game controller, at 904. The mechanical resistance setting is associated with the gameplay event. For example, the information handling system 102 may determine the mechanical resistance setting 144 based on the gameplay event 108.

The method 900 further includes determining, by the information handling system, one or more positions of the input device at which the mechanical resistance setting is to be applied, at 906. The mechanical resistance setting is associated with the gameplay event. For example, the information handling system 102 may determine the one or more positions 146 based on the gameplay event 108.

The method 900 further includes sending, by the information handling system to the game controller, a control signal indicating a configuration of the input device, at 908. The configuration is associated with the mechanical resistance setting and the one or more positions. For example, the information handling system 102 may sent the control signal 140 to the game controller 150 to indicate the configuration 142.

The method 900 may further include receiving, by the information handling system and from the game controller, user input associated with the video game application, where the user input is received via the input device based on the configuration. For example, the information handling system 102 may receive the user input 170 from the game controller 150 via the interface 130, where the user input 170 is received by the game controller 150 via the input device 152 and based on the configuration 142.

FIG. 10 is a flow chart of an example of a method 1000 of operation of a game controller according to some aspects. In some examples, the method 800 may be performed by the game controller 150 of FIG. 1.

The method 1000 may include receiving a control signal indicating a configuration of an input device, at 1002. The configuration is associated with a mechanical resistance setting of the input device and is further associated with one or more positions of the input device. For example, the game controller 150 may receive the control signal 140 indicating the configuration 142 of the input device 152, and the configuration 142 may be associated with the mechanical resistance setting 144 and the one or more positions 146.

The method 1000 may further include applying the mechanical resistance setting to the input device via an adjustable resistance device based on the one or more positions, at 1004. For example, the game controller 150 may apply the mechanical resistance setting to the input device 152 (or the trigger 202) via any of the adjustable resistance devices 154, 300, 400, 500, 600, or 700 based on the one or more positions 146.

The method 1000 may further include receiving user input via the input device based on the configuration, at 1006. For example, a user may pull the trigger 202 through a range of positions, such as the first range of positions 212, the second range of positions 214, or a combination of the first range of positions 212 and the second range of positions 214 to generate the user input 170, which may be detected by the controller 156.

The method 1000 may optionally include transmitting the user input to the information handling system 102. For example, the controller 156 may initiate transmission of the user input 170 to the information handling system 102 via the interface 158.

Although certain aspects of the disclosure are described separately for convenience, it is noted that some aspects may be combined without departing from the scope of the disclosure. For example, in some implementations, an adjustable resistance may include any combination of features described with reference to the adjustable resistance devices 154, 300, 400, 500, 600, and 700. Those of skill in the art will appreciate that other such examples are also within the scope of the disclosure.

In some implementations, one or more operations described above as performed by a system, server, controller, or other device may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions, which may be contained in software, such as firmware. Further, the logic circuitry may be configured as a general purpose processor capable of executing instructions contained in software and/or firmware. If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EE-PROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. For example, although certain processors (e.g., the processor 104, the controller 156, or both) have been described, aspects may be executed on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system comprising:
a memory; and
a processor coupled to the memory and configured to:
detect, during execution of a video game application, a gameplay event associated with the video game application;
determine a mechanical resistance setting associated with an input device of a game controller, wherein the mechanical resistance setting is associated with the gameplay event;
determine one or more positions of the input device at which the mechanical resistance setting is to be applied, the one or more positions including a first position of the input device at which application of the mechanical resistance setting is to take effect; and
send, to the game controller, a control signal indicating a configuration of the input device, wherein the configuration indicates the mechanical resistance setting and the one or more positions.

2. The information handling system of claim 1, wherein the processor is further configured to receive, from the game controller, user input associated with the video game application via the input device based on the configuration.

3. The information handling system of claim 1, wherein the one or more positions further include a second position at which the application of the mechanical resistance setting is to cease.

4. The information handling system of claim 1, wherein the control signal indicates a change of the first position based on the gameplay event.

5. The information handling system of claim 3, wherein the control signal indicates a change of the second position based on the gameplay event.

6. The information handling system of claim 3, wherein the control signal indicates changes of both the first position and the second position based on the gameplay event.

7. The information handling system of claim 1, wherein the input device includes or corresponds to a trigger, wherein the one or more positions are selected from a set of positions corresponding to a trigger throw motion of the trigger, and wherein the mechanical resistance setting indicates one or more mechanical resistance values as a function of position of the trigger.

8. The information handling system of claim 1, wherein the control signal indicates a change of the mechanical resistance setting based on the gameplay event.

9. The information handling system of claim 1, wherein the memory is configured to store mechanical resistance mapping data indicating a plurality of gameplay events including the gameplay event and further indicating a plurality of configurations associated with the plurality of gameplay events, the plurality of configurations including the configuration.

10. The information handling system of claim 9, wherein the processor is further configured to:
access the mechanical resistance mapping data; and
based on the gameplay event, select the configuration from the plurality of configurations.

11. The information handling system of claim 1, wherein the configuration is associated with a first range of positions and a second range of positions, wherein pressing the input device through the first range of positions initiates a first operation associated with the video game application, and wherein pressing the input device through the second range of positions initiates a second operation associated with the video game application that is different than the first operation.

12. The information handling system of claim 1, wherein the input device is included in a game controller that further includes a magnetorheological fluid (MRF) brake coupled to the input device via a linkage structure, and wherein the MRF brake is configured to apply resistive torque to the input device via the linkage structure based on the configuration.

13. The information handling system of claim 1, wherein the input device is included in a game controller that further includes a magnetorheological fluid (MRF) brake coupled to the input device via a ring gear, and wherein the MRF brake is configured to apply resistive torque to the input device via the ring gear based on the configuration.

14. A method comprising:
  detecting, by an information handling system during execution of a video game application, a gameplay event associated with the video game application;
  determining, by the information handling system, a mechanical resistance setting associated with an input device of a game controller, wherein the mechanical resistance setting is associated with the gameplay event;
  determining, by the information handling system, one or more positions of the input device at which the mechanical resistance setting is to be applied, the one or more positions including a first position of the input device at which application of the mechanical resistance setting is to take effect; and
  sending, by the information handling system to the game controller, a control signal indicating a configuration of the input device, wherein the configuration indicates the mechanical resistance setting and the one or more positions.

15. The method of claim 14, wherein the one or more positions further include a second position at which the application of the mechanical resistance setting is to cease, and wherein the control signal indicates changes of both the first position and the second position based on the gameplay event.

* * * * *